US008739662B2

(12) United States Patent
Huang

(10) Patent No.: US 8,739,662 B2
(45) Date of Patent: Jun. 3, 2014

(54) TELESCOPIC HANDLE FOR A HAND TOOL

(76) Inventor: Chin-Tan Huang, Taichung (TW)

( * ) Notice: Subject to any disclaimer, the term of this patent is extended or adjusted under 35 U.S.C. 154(b) by 274 days.

(21) Appl. No.: 13/447,478

(22) Filed: Apr. 16, 2012

(65) Prior Publication Data

US 2013/0160618 A1 Jun. 27, 2013

(30) Foreign Application Priority Data

Dec. 22, 2011 (TW) ............................. 100224258 U

(51) Int. Cl.

| | |
|---|---|
| ***B25G 1/01*** | (2006.01) |
| ***B25B 23/16*** | (2006.01) |
| ***B25G 1/04*** | (2006.01) |
| ***B23B 47/00*** | (2006.01) |
| ***B23B 49/00*** | (2006.01) |
| ***B25G 1/00*** | (2006.01) |

(52) U.S. Cl.
USPC ........... 81/489; 81/177.85; 81/177.2; 408/95; 408/96; 408/97

(58) Field of Classification Search
USPC ................. 81/489, 177.2, 177.85; 408/95–97
See application file for complete search history.

(56) References Cited

U.S. PATENT DOCUMENTS

| | | | | | |
|---|---|---|---|---|---|
| 3,227,015 | A | * | 1/1966 | Tremblay | 81/177.2 |
| 5,109,737 | A | * | 5/1992 | Raber | 81/177.2 |
| 6,182,539 | B1 | * | 2/2001 | Webster | 81/177.2 |
| 6,408,721 | B1 | * | 6/2002 | Lee | 81/60 |
| 7,013,765 | B2 | * | 3/2006 | Chang | 81/177.2 |
| 7,188,553 | B1 | * | 3/2007 | Pryor | 81/177.2 |
| 7,497,149 | B2 | * | 3/2009 | Lin | 81/62 |
| 7,878,094 | B2 | * | 2/2011 | Lin | 81/177.2 |
| 2002/0162426 | A1 | * | 11/2002 | Lee | 81/177.85 |
| 2004/0020331 | A1 | * | 2/2004 | Lee | 81/177.2 |
| 2007/0131070 | A1 | * | 6/2007 | Hull et al. | 81/489 |

* cited by examiner

*Primary Examiner* — Monica Carter
*Assistant Examiner* — Danny Hong
(74) *Attorney, Agent, or Firm* — Shook Hardy & Bacon LLP

(57) ABSTRACT

A telescopic handle for a hand tool includes a main shank connected to a tool head at a distal end and insertable into an outer sleeve which a user grips. The main shank has a plurality of axially spaced retained regions such that a radially movable retaining member is engageable with a selected one of the retained regions. A key-and-keyway mechanism is disposed to guide axial movement of the outer sleeve and to guard against rotation of the outer sleeve relative to the main shank so as to permit delivery of an appropriate torque to the main shank. An operating member is disposed on and movable axially relative to the outer sleeve to radially move the retaining member.

7 Claims, 5 Drawing Sheets

TELESCOPIC HANDLE FOR A HAND TOOL

CROSS-REFERENCE TO RELATED APPLICATION

This application claims priority of Taiwanese Utility Model Application No. 100224258, filed on Dec. 22, 2011, the disclosure of which is herein incorporated by reference.

BACKGROUND OF THE INVENTION

1. Field of the Invention

This invention relates to a hand tool, more particularly to a telescopic handle for a hand tool.

2. Description of the Related Art

A conventional torque hand tool, such as a ratchet wrench, generally includes a driving head and a handle connected to the driving head. To facilitate storage of the hand tool, the handle includes a main shank fixed to the driving head at one end, and an outer sleeve movably sleeved on the main shank to be extendible relative to the driving head. A retaining ring or a coil spring is sleeved on the main shank to be in resilient contact with the outer sleeve so as to frictionally retain the outer sleeve to the main shank. As the retaining force generated between the retaining ring and the outer sleeve is insufficient, the outer sleeve which a user's hand grips during operation, such as a screw fastening operation, may be inadvertently moved or rotated relative to the main shank, which will adversely affect the torque delivered to a workpiece, such as a screw.

SUMMARY OF THE INVENTION

An object of the present invention is to provide a telescopic handle for a hand tool which ensures positioning between a main shank and an outer sleeve for preventing axial and rotational movement therebetween during operation of the hand tool.

According to this invention, the telescopic handle includes an outer sleeve elongated along an axis to terminate at first and second ends, and having an inner peripheral surface which defines an axial bore. A main shank has a distal end for connection to a tool head, a proximate end opposite to the distal end along the axis, and an outer surrounding surface which extends between the distal and proximate ends, and which is configured to be inserted into the axial bore and in fitting engagement with the inner peripheral surface so as to be slidable and rotatable relative to the inner peripheral surface along and about the axis. The outer surrounding surface has a plurality of retained regions axially displaced from each other. A key-and-keyway mechanism includes a keyway which is formed in one of the outer surrounding surface and the inner peripheral surface, and which extends axially, and a key member which is disposed in and extends radially and outwardly of the other one of the outer surrounding surface and the inner peripheral surface, and which is matingly engaged with the keyway to guide movement of the main shank along the axis and to guard against rotation of the main shank about the axis relative to the outer sleeve. The key member is angularly displaced from the retained regions about the axis. A retaining member has retaining and actuated ends opposite to each other radially, and is disposed in and movable radially relative to the inner peripheral surface between an extended position, where the retaining end extends outwardly of the inner peripheral surface to engage a selected one of the retained regions so as to guard against the movement of the main shank along the axis, and a retracted position, where the retaining end is retracted into the outer sleeve to be disengaged from the retained regions so as to permit the movement of the main shank along the axis. An operating member is disposed to be movable axially relative to the outer sleeve, and has an actuating surface moved axially to actuate the actuated end so as to move the retaining member between the extended and retracted positions. The operating member can be moved by a user with the hand gripping the outer sleeve to permit radial movement of the retaining member for adjusting the length of the handle. The key-and-keyway mechanism can guide the axial movement of the outer sleeve while guarding against rotation of the outer sleeve relative to the main shank.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
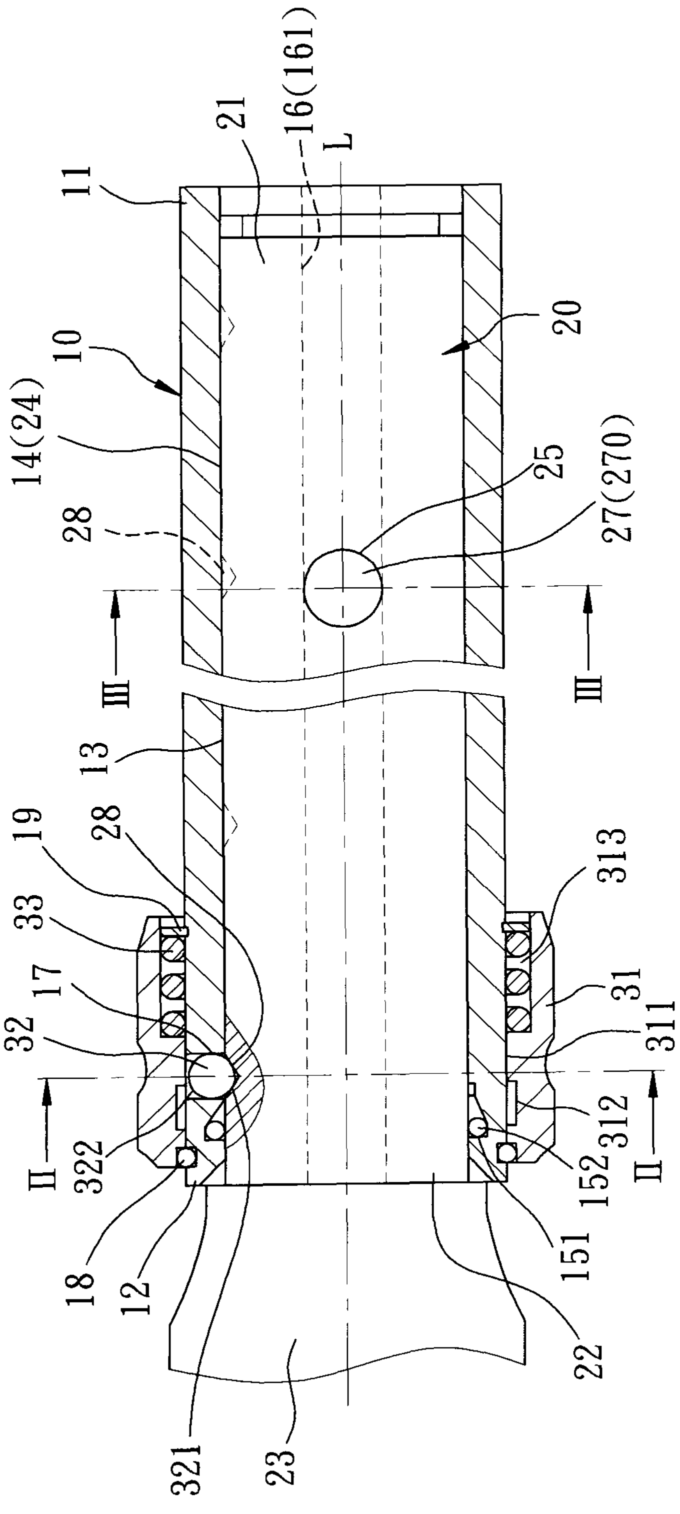
FIG. 1 is a fragmentary sectional view of the preferred embodiment of a telescopic handle according to this invention.
Figure 2:
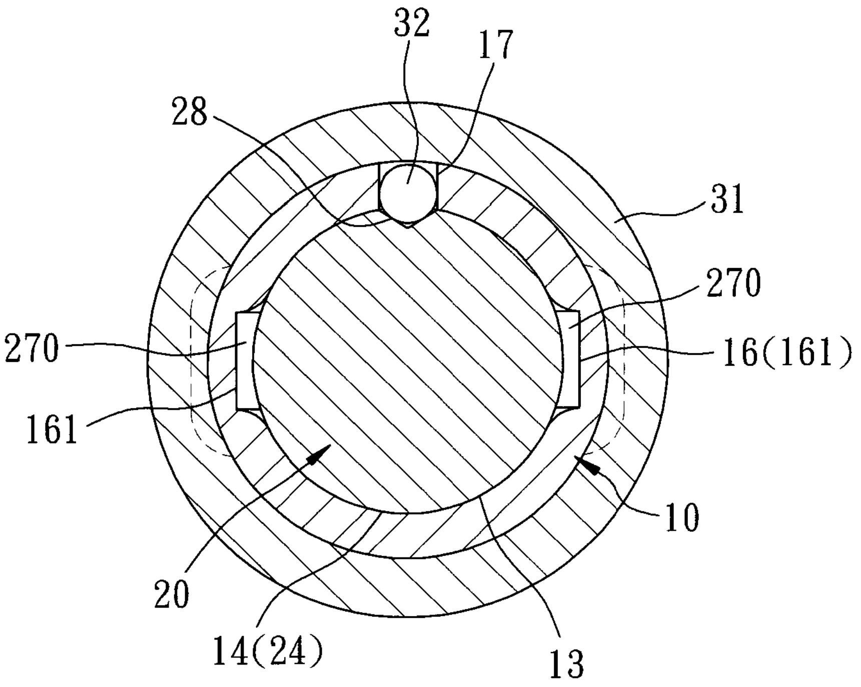
FIG. 2 is a cross-sectional view taken along line II-II of FIG. 1.
Figure 3:
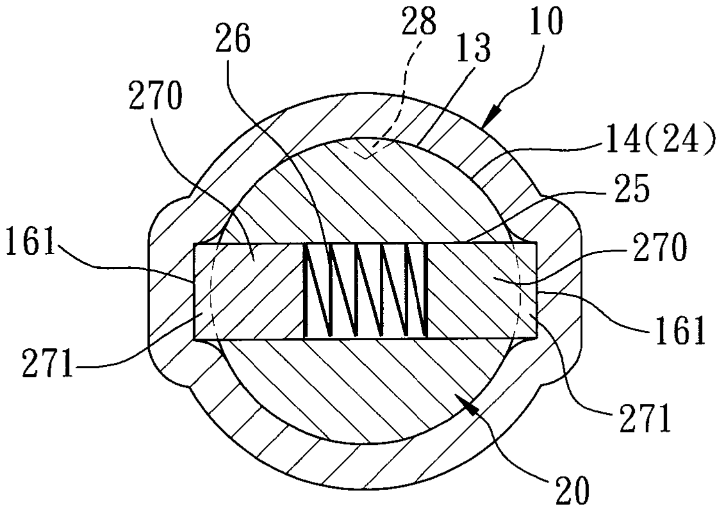
FIG. 3 is a cross-sectional view taken along line III-III of FIG. 1.

Referring to FIGS. 1 to 3, the preferred embodiment of a telescopic handle for a hand tool according to the present invention is shown to comprise an outer sleeve 10, a main shank 20, a key-and-keyway mechanism, a retaining member 32, and an operating member 31.

The outer sleeve 10 is elongated along an axis (L) to terminate at first and second ends 11, 12, and has an inner peripheral surface 14 which defines an axial bore 13. Adjacent to the second end 12, a passage 17 is formed and extends radially through the inner peripheral surface 14. Forward and rearward limits 18, 19 are disposed on the outer sleeve 10. An annular recess 151 is formed in the inner peripheral surface 14. A retaining ring 152 is disposed in the annular recess 151.

The main shank 20 has a distal end 22 for being connected to a tool head 23, a proximate end 21 opposite to the distal end 22 along the axis (L), and an outer surrounding surface 24 which extends between the distal and proximate ends 22, 21, and which is configured to be inserted into the axial bore 13 and in fitting engagement with the inner peripheral surface 14 so as to be slidable and rotatable relative to the inner peripheral surface 14 along and about the axis (L). The outer surrounding surface 24 has a plurality of retained regions 28 which are axially displaced from each other and each of which is in the form of a concavity 28. A through hole 25 is formed adjacent to the proximate end 21 and extends radially through the outer surrounding surface 24. By virtue of the retaining ring 152 which extends radially and outwardly of the inner peripheral surface 14, the main shank 20 is in resilient contact with the inner peripheral surface 14 of the outer sleeve 10.

The key-and-keyway mechanism includes a keyway 16, a key member 27, and a first biasing member 26. In this embodiment, the keyway 16 includes two elongated grooves 161 which are formed in the inner peripheral surface 14 to be diametrically opposite to each other and which extend axially. The key member 27 includes two pins 270 which are slidably inserted in the through hole 25 to be radially spaced apart from each other. Each of the pins 270 extends radially to terminate at an end 271 which projects outwardly of the through hole 25 to be matingly engaged with the respective elongated groove 161 so as to guide axial movement of the main shank 20 along the axis (L) and to guard against rotation of the main shank 20 about the axis (L) relative to the outer sleeve 10. The first biasing member 26 is disposed in the through hole 25 to be interposed between the pins 270 so as to bias the pins 270 towards the corresponding elongated grooves 161. The key member 27 is angularly displaced from the retained regions 28 about the axis (L).

Figure 4:
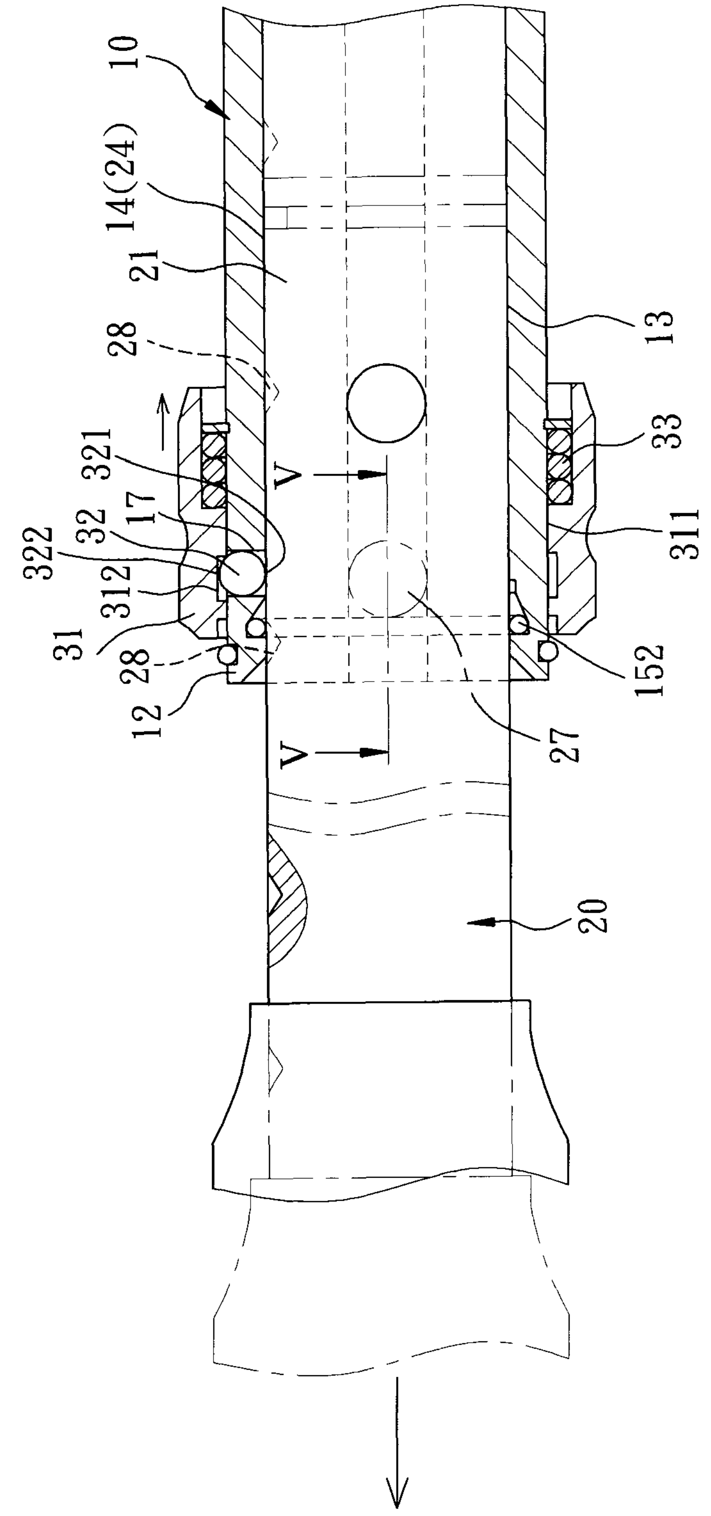
FIG. 4 is a fragmentary sectional view of the preferred embodiment showing a retaining member in a retracted position.

The retaining member 32 is a roller 32 which is disposed and radially movable in the passage 17. The roller 32 has an outer roller surface which has two diametrically opposite areas serving as retaining and actuated ends 321, 322, respectively. Hence, the roller 32 is movable radially relative to the inner peripheral surface 14 between an extended position (as shown in FIG. 1), where the retaining end 321 extends outwardly of the inner peripheral surface 14 to engage a selected one of the retained regions 28 so as to guard against the axial movement of the main shank 20, and a retracted position (as shown in FIG. 4), where the retaining end 321 is retracted into the passage 17 to be disengaged from the retained regions 28 so as to permit the axial movement of the main shank 20 along the axis (L).

The operating member 31 is a shell 31 which is disposed on and movable axially relative to the outer sleeve 10 between the forward and rearward limits 18, 19, and which has an inner shell surface confronting the passage 17 to serve as an actuating surface. The inner shell surface has a non-actuating region 312 and an actuating region 311 axially opposite to each other and configured such that, upon an axial displacement of the shell 31 relative to the outer sleeve 10 from a forward position (see FIG. 1), where the actuating region 311 is engaged with the actuated end 322 of the roller 32, to a rearward position (see FIG. 4), where the non-actuating region 312 is engaged with the actuated end 322, the retaining end 321 is radially moved from the extended position to the retracted position. Further, a second biasing member 33 is disposed in an opening 313 in the shell 31 to bias the shell 31 toward the forward position. By virtue of the forward and rearward limits 18, 19, the axial displacement of the shell 31 is limited between the forward and rearward positions.

When it is desired to adjust the length of the handle, the user can push the shell 31 rearward with the hand gripping the outer sleeve 10 to move the shell 31 to the rearward position, and then slide the outer sleeve 10 axially relative to the main shank 20, thereby forcing the roller 32 to engage the non-actuating region 312 so as to place the roller 32 in the retracted position. By virtue of the key-and-keyway mechanism, the length adjustment which requires merely an axial movement of the outer sleeve 10 can be smoothly and effortlessly conducted, and undesirable rotation of the outer sleeve 10 relative to the main shank 20 during a torque delivering operation of the hand tool can also be successfully prevented, thereby ensuring delivery of a steady torque from the outer sleeve 10 to the main shank 20 during a screw fastening operation. Moreover, by virtue of the first biasing member 26, the ends 271 of the pins 270 can be kept in resilient contact with the outer sleeve 10 so as to generate an appropriate frictional force for guiding the axial movement of the outer sleeve 10.

Figure 5:
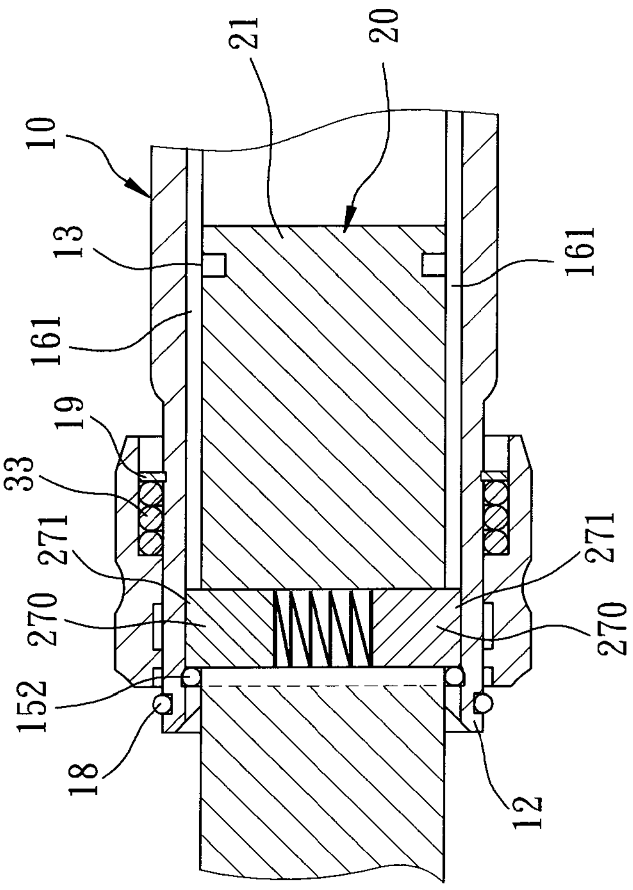
FIG. 5 is a cross-sectional view taken along line V-V of FIG. 4.

Further, as shown in FIG. 5, when the second end 12 of the outer sleeve 10 is moved toward the proximate end 21 for extending the handle to a maximum extent, the ends 271 of the pins 270 will be blocked by the retaining ring 152, thereby preventing removal of the outer sleeve 10 from the main shank 20.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A telescopic handle for a hand tool, comprising:

an outer sleeve elongated along an axis to terminate at first and second ends, and having an inner peripheral surface which defines an axial bore;

a main shank having a distal end for connection to a tool head, a proximate end opposite to said distal end along the axis, and an outer surrounding surface which extends between said distal and proximate ends, and which is configured to be inserted into said axial bore and in fitting engagement with said inner peripheral surface so as to be slidable and rotatable relative to said inner peripheral surface along and about the axis, said outer surrounding surface having a plurality of retained regions which are axially displaced from each other;

a key-and-keyway mechanism including a keyway which is formed in one of said outer surrounding surface and said inner peripheral surface, and which extends axially, and a key member which is disposed in and extends radially and outwardly of the other one of said outer surrounding surface and said inner peripheral surface, and which is matingly engaged with said keyway to guide movement of said main shank along the axis and to guard against rotation of said main shank about the axis relative to said outer sleeve, said key member being angularly displaced from said retained regions about the axis;

a retaining member having retaining and actuated ends opposite to each other radially, and disposed in and movable radially relative to said inner peripheral surface between an extended position, where said retaining end extends outwardly of said inner peripheral surface to engage a selected one of said retained regions so as to guard against the movement of said main shank along the axis, and a retracted position, where said retaining end is retracted into said outer sleeve to be disengaged from said retained regions so as to permit the movement of said main shank along the axis; and an operating member disposed to be movable axially relative to said outer sleeve and having an actuating surface which is configured to be moved axially to actuate said actuated end so as to move said retaining member between the extended and retracted positions.

2. The telescopic handle as claimed in claim 1, wherein said keyway is formed in said inner peripheral surface, and said key member is disposed in said main shank, and extends radially to terminate at an end that is matingly engaged with said keyway, said key-and-keyway mechanism further including a first biasing member which is disposed to bias said key member towards said keyway.

3. The telescopic handle as claimed in claim 2, wherein said main shank has a through hole which extends radially through said outer surrounding surface, and said keyway includes two elongated grooves which are diametrically opposite to each other, said key member including two pins which are slidably inserted in said through hole, and which are radially spaced apart from each other, said first biasing member being interposed between said pins to bias said pins towards said elongated grooves, respectively.

4. The telescopic handle as claimed in claim 2, wherein said key member is disposed adjacent to said proximate end, said outer sleeve having a retaining ring disposed in and extending radially and outwardly of said inner peripheral surface adjacent to said second end such that said main shank is in resilient contact with said inner peripheral surface, and such that said end of said key member is blocked by said retaining ring so as to prevent excessive movement of said main shank.

5. The telescopic handle as claimed in claim 1, wherein said outer sleeve has a passage extending radially through said inner peripheral surface adjacent to said second end, said retaining member being a roller which is disposed and radially movable in said passage and which has an outer roller surface that has two diametrically opposite areas serving as said retaining and actuated ends, respectively, said operating member being a shell which has an inner shell surface confronting said passage and serving as said actuating surface, said inner shell surface having a non-actuating region and an actuating region axially opposite to each other such that, upon an axial displacement of said shell relative to said outer sleeve from a forward position, where said actuating region is engaged with said actuated end, to a rearward position, where said non-actuating region is engaged with said actuated end, said retaining member is radially moved from the extended position to the retracted position.

6. The telescopic handle as claimed in claim 5, further comprising a second biasing member disposed to bias said shell toward the forward position.

7. The telescopic handle as claimed in claim 5, further comprising forward and rearward limits disposed on said outer sleeve to limit the axial displacement of said shell between the forward and rearward positions.

* * * * *